(12) United States Patent
Yuhara et al.

(10) Patent No.: US 8,306,548 B2
(45) Date of Patent: Nov. 6, 2012

(54) NAVIGATION DEVICE FOR COMMUNICATION TO AN INFORMATION PROVIDING SERVER

(75) Inventors: Hiromitsu Yuhara, Saitama (JP); Hideo Furukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 590 days.

(21) Appl. No.: 12/245,388

(22) Filed: Oct. 3, 2008

(65) Prior Publication Data

US 2009/0092042 A1 Apr. 9, 2009

(30) Foreign Application Priority Data

Oct. 5, 2007 (JP) ................................ 2007-261588

(51) Int. Cl.
*H04W 72/00* (2009.01)
(52) U.S. Cl. ........... 455/452.2; 340/995.13; 340/995.19; 370/216; 370/236.1; 701/118; 701/423; 701/425
(58) Field of Classification Search ............... 455/452.2; 701/118, 423, 425
See application file for complete search history.

(56) References Cited

U.S. PATENT DOCUMENTS

| | | | | |
|---|---|---|---|---|
| 5,731,978 | A * | 3/1998 | Tamai et al. ................. | 701/201 |
| 2005/0240673 | A1 * | 10/2005 | Yoneda et al. ............... | 709/229 |
| 2007/0081607 | A1 * | 4/2007 | Kludt et al. .................. | 375/267 |
| 2007/0208507 | A1 * | 9/2007 | Gotoh ........................... | 701/210 |
| 2008/0123768 | A1 * | 5/2008 | Harel et al. ................... | 375/267 |
| 2008/0201070 | A1 * | 8/2008 | Kikuchi ........................ | 701/209 |

FOREIGN PATENT DOCUMENTS

| | | |
|---|---|---|
| JP | 7-141273 | 6/1995 |
| JP | 9-18545 | 1/1997 |
| JP | 2003-333271 | 11/2003 |
| JP | 2004-125415 | 4/2004 |
| JP | 2005-301913 | 10/2005 |
| JP | 2006-189387 A * | 7/2006 |
| JP | 2006-221516 | 8/2006 |

OTHER PUBLICATIONS

Hioyasu et al, Communication Performance Adjustment Processor, Jun. 2, 1995, Fujitsu Ltd, JP 07-141273, Translation from Japanese to English.*
Iwami et al, Navigation Device, Jul. 20, 2006, Matsushita Electric Ind. Co. Ltd, JP 06-189387, Translation from Japanese to English.*
Japanese Office Action for Application No. 2007-261588, pp. 1-3, dated Mar. 6, 2012.

* cited by examiner

*Primary Examiner* — Rafael Pérez-Gutiérrez
*Assistant Examiner* — Liton Miah
(74) *Attorney, Agent, or Firm* — Nelson Mullins Riley & Scarborough LLP; Anthony A. Laurentano

(57) ABSTRACT

The present invention provides a navigation device which performs communication with an information-providing server device. The navigation device (3) includes a communication section (11) which transmits a message to the server device for a response confirmation, and receives a response message with respect to the message from the server device; a response value obtaining section (12) which determines a time duration from a time when the message is transmitted to another time when the response message is received, and obtains a response value indicating a communication state in relation to a communication time on the basis of the determined time duration; and a communication-parameter setting section (13) which determines an optimal communication parameter on the basis of the response value obtained by the response value obtaining device, and sets the optimal communication parameter in a communication parameter in relation to a communication disconnection condition used in the navigation device (3).

2 Claims, 2 Drawing Sheets

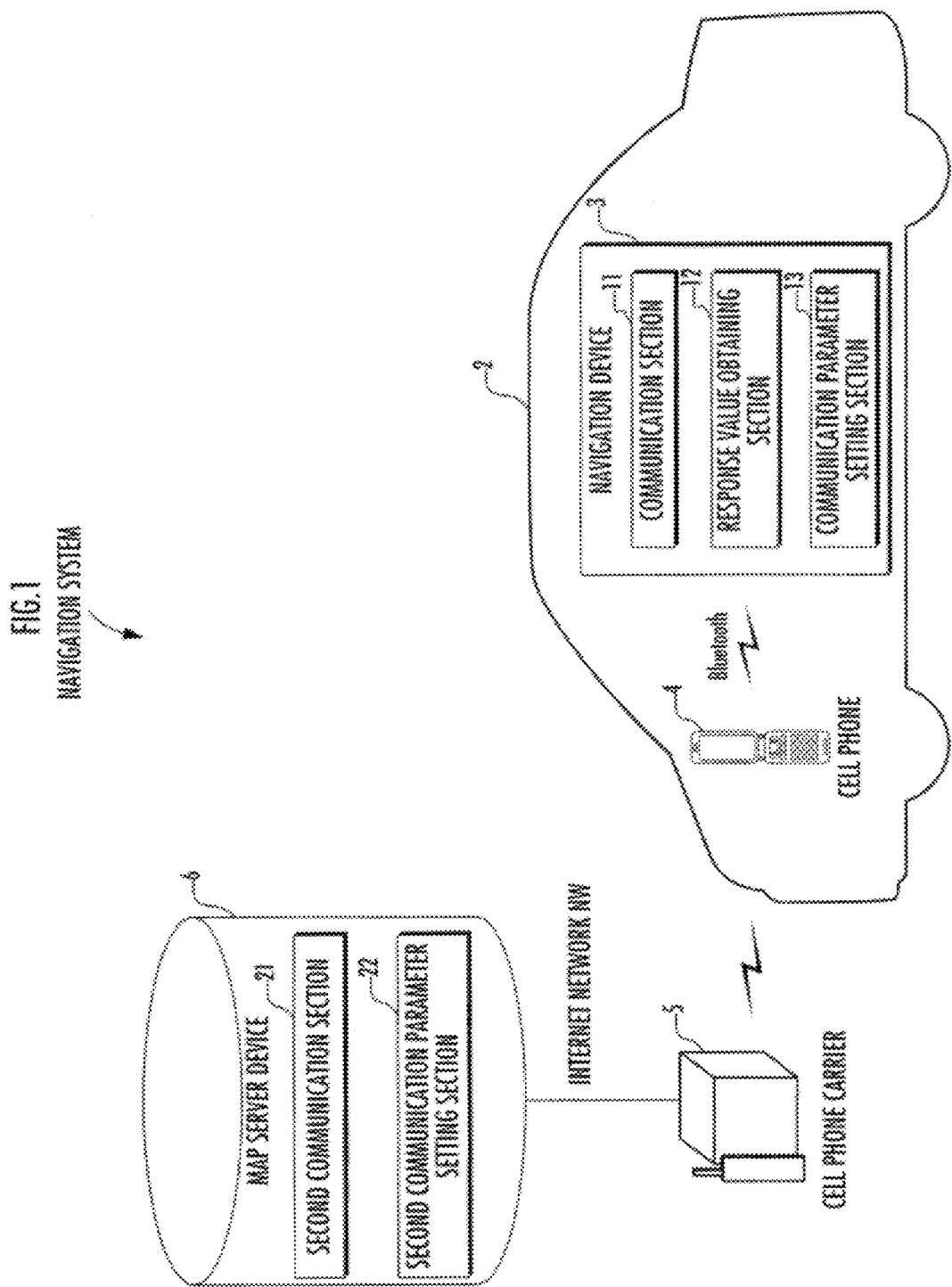

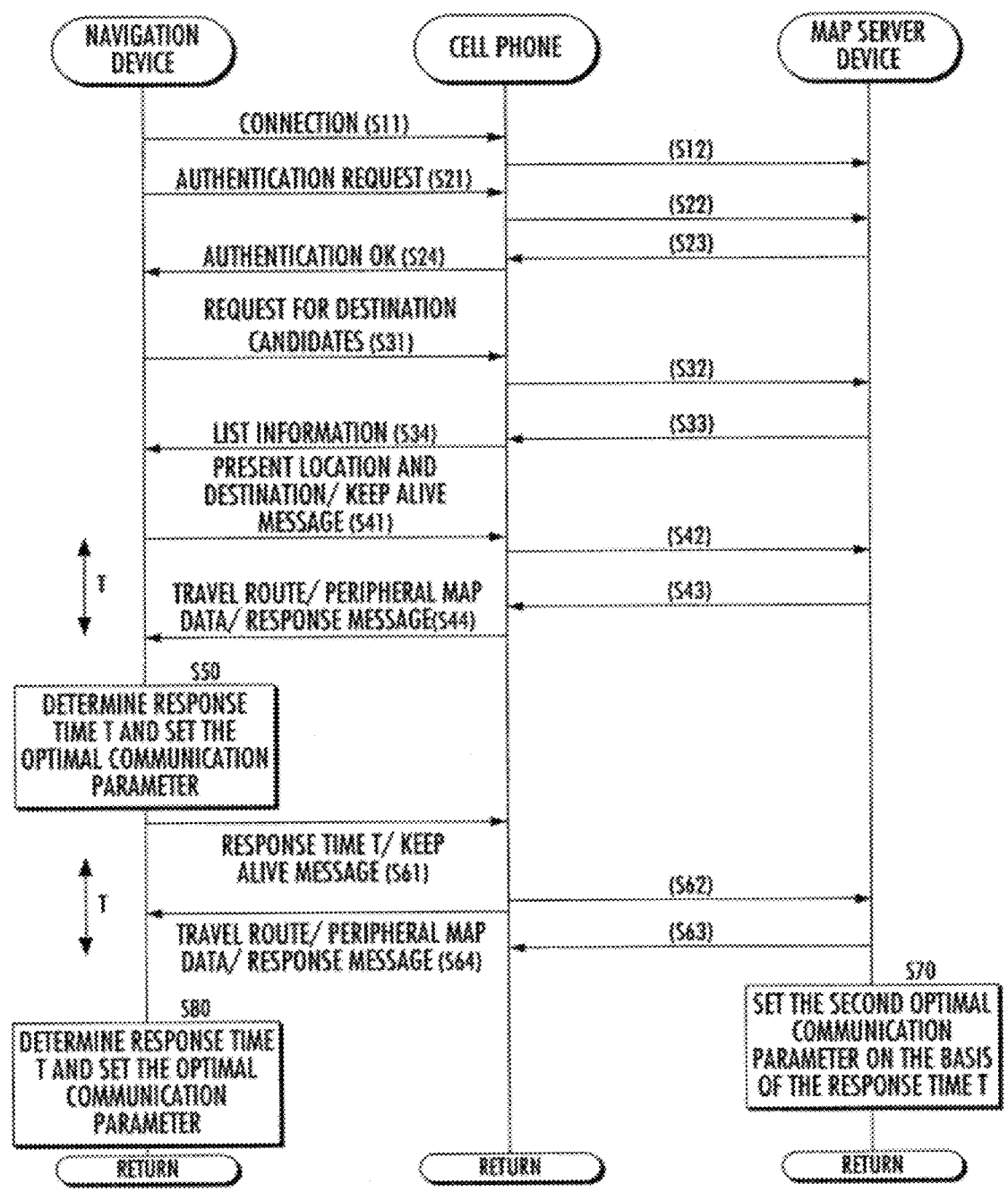

NAVIGATION DEVICE FOR COMMUNICATION TO AN INFORMATION PROVIDING SERVER

PRIORITY CLAIM

The present application is based on and claims the priority benefit of Japanese Patent Application 2007-261588 filed on Oct. 5, 2007, the contents of which are incorporated herein by reference in its entirety.

BACKGROUND OF THE INVENTION

1. Field of the Invention

The present invention relates to a navigation device and a navigation system which obtain information such as map data or the like via communication.

2. Description of the Related Art

When a navigation device which obtains information such as map data and the like through communication with a sever device performs communication via a communication device fitted in the navigation device which is mounted in a vehicle and the like, or a communication device carried by a user (for example, a mobile terminal, such as a cell phone or the like), the following problems will occur due to a communication condition such as the type and functions or the like of the communication device, and a communication state relevant to areas and time slots or the like. Specifically, take a cell phone for an example. The performance on communication speed of a cell phone differs according to the development on the communication method and model thereof. Therefore, in the case where the navigation device sets a communication parameter such as a time-out value, a retry number of times or the like to fit a cell phone of an old model (with low communication speed performance), it is possible to support plural models of cell phones, however, this will cause a cell phone with high communication speed performance waiting for a longer time, which is inconvenient. On the other hand, in the case where the navigation device sets the communication parameter to fit a cell phone with high communication speed performance, it is impossible to support plural models of cell phones. Therefore, it is desirable to modify the communication parameter so as to fit a cell phone. Further, a cell phone of a newer model may be on sale after the shipment of the navigation device, thereby, it is conceivable that the communication parameter pre-installed in the navigation device may not work appropriately on the cell phone of a newer model.

Moreover, the coverage (available communication area) of a cell phone differs according to each carrier (communication service provided by communication service providing company). Further, the magnitude of electromagnetic waves varies at different communication locations. Therefore, in the case where a user is in an unavailable communication area, inappropriate configuration of the communication parameter will cause the user waiting for a longer time, or consume the battery of the cell phone due to frequent connection retry. In addition, since the coverage of a cell phone varies according to the addition or development of implants, it is desirable to modify the communication parameter to fit the coverage variation of the cell phone. However, it is difficult for the user to appropriately modify the communication parameter personally so as to fit a particular coverage condition.

Further, it is necessary to set a time-out value of the communication parameter longer in a time slot when the communication is congested (for example, early in the evening) than the other time slots. However, as the configuration of the time-out value depends on the communication congestion, it is difficult for a user to set appropriately the communication parameter according to the communication congestion at a particular time slot.

Regarding the above cases, there has been disclosed a device which modifies a configuration of the communication parameter according to the communication condition in Japanese Patent Laid-open No. H7-141273. The communication performance processing device, as a prior art, carries out a communication control process by sequentially configuring different communication control parameters, obtains determination values by monitoring the communication under each of the communication control parameters, and sets an optimal communication control parameter by mutually comparing the obtained determination values.

However, according to the communication performance processing device, it is necessary to perform repeatedly the communication control process by sequentially varying the communication control parameters in a predefined range which is set on the basis of predefined initial values and to compare mutually the determination values so as to determine the optimal communication control parameters. Therefore, it is disadvantageous since it costs longer time to determine the optimal communication control parameters.

SUMMARY OF THE INVENTION

The present invention has been accomplished in view of the aforementioned problems, and it is therefore an objective of the present invention to provide a navigation device and a navigation system which improves communication efficiency by configuring the optimal communication parameter which is determined promptly in correspondence to a communication condition and communication state.

The navigation device which performs communication with an information-providing server device of a first aspect of the present invention, includes: a communication section which transmits a message to the server device for a response confirmation, and receives a response message with respect to the message from the server device; a response value obtaining section which determines a time duration from a time when the message is transmitted to another time when the response message is received, and obtains a response value indicating a communication state in relation to a communication time on the basis of the determined time duration; and a communication-parameter setting section which determines an optimal communication parameter on the basis of the response value obtained by the response value obtaining device, and sets the optimal communication parameter in a communication parameter in relation to a communication disconnection condition used in the navigation device.

According to the navigation device of the first aspect of the present invention, the message is transmitted to the server device for the response confirmation and the response message with respect to the message from the server device is received through the communication section. Herein, the communication section includes a configuration which utilizes the communication function of a communication device (for example, a cell phone or the like carried by a user) separate to the navigation device to communicate with the server device, and/or a configuration which utilizes a communication device which is mounted in (built-in) the navigation device to communicate directly with the server device.

The response value obtaining section determines the time duration from a time when the message is transmitted to another time when the response message is received, and obtains the response value indicating a communication state on the basis of the determined time duration. The time duration (response time) from the time when the message is transmitted to another time when the response message is received can be used as the response value. The obtained response value in the mentioned way indicates appropriately the communication state in relation to the communication time. The response value can be in a relatively short time by receiving the response message for the message at one time. Accordingly, the optimal communication parameter conformable to the communication state can be determined on the basis of the obtained response value by the communication parameter setting section. Therefore, it is possible for the communication parameter setting section to set sequentially in real time in communication the optimal communication parameter in correspondence to the communication condition and communication state by configuring the communication parameter in relation to the communication disconnection condition used by the navigation device at the determined optimal communication parameter. By configuring the communication parameter in relation to the communication disconnection condition optimally in real time in communication according to the mentioned way, the communication connection can be assured to cope with various communication conditions and communication states. Furthermore, the communication disconnection condition is optimal conformable to the respective communication condition and communication state, it is able to reduce the communication time and the retry number of times, thereby, improving the communication efficiency.

According to the present invention, the optimal communication parameter can be determined and set according to the communication conditions such as the type, function and the like of the communication means; and the communication state in correspondence to the areas, time slots and the like, thereby, improving the communication efficiency.

The navigation device of a second aspect of the present invention is dependent on the navigation device of the first aspect of the present invention, wherein the communication parameter includes at least one of a time-out value for determining the communication disconnection and a retry number of times after the communication disconnection.

According to the navigation device of the second aspect of the present invention, the time-out value which is used to disconnect the communication and the retry number of times after the communication is disconnected is sequentially set at the optimal values, as a result, the communication disconnection condition is optimal and the communication efficiency is improved.

The navigation system of a third aspect of the present invention has a navigation device which has mobility or is mounted in a functional device carried by a user, and a server device which provides information to the navigation device via communication, wherein the navigation device includes: a communication section which transmits a message to the server device for a response confirmation, and receives a response message to the message from the server device; a response value obtaining section which determines a time duration from a time when the message is transmitted to another time when the response message is received, and obtains a response value indicating a communication state in relation to a communication time on the basis of the determined time duration; and a communication-parameter setting section which determines an optimal communication parameter on the basis of the response value obtained by the response value obtaining device, and sets the optimal communication parameter in a communication parameter in relation to a communication disconnection condition used in the navigation device, and the server device includes a second communication section which transmits the response message in response to the receiving of the message transmitted from the navigation device.

According to the navigation system of the third aspect of the present invention, as explained in the navigation device of the first aspect of the present invention, the response value indicating the communication state in relation to the communication time is obtained on the basis of the determination result, that is, the time duration from the time when the message is transmitted to the time when the response message is received; the optimal communication parameter is determined on the basis of the obtained response value; and the communication parameter in relation to the communication disconnection condition used in the navigation device is varied sequentially to the determined optimal communication parameter. According thereto, the optimal communication parameter can be determined and set according to the communication condition such as the type, function and the like of the communication means; and the communication state conformable to the areas, time slots and the like, thereby, improving the communication efficiency.

The navigation system of a fourth aspect of the present invention is dependent on the navigation system of the third aspect of the present invention, wherein the communication section of the navigation device transmits the response value obtained by the response value obtaining section to the server device; the second communication section of the server device receives the response value transmitted by the navigation device; and the sever device includes a second communication parameter setting section which determines a second optimal communication parameter on the basis of the response value received by the second communication section, and sets the second optimal communication parameter in a second communication parameter in relation to a data transmitting condition used in the server device.

According to the navigation system of the fourth aspect of the present invention, the response value obtained in the navigation device is obtained by the sever device via communication, and the server device determines the second optimal communication parameter on the basis of the response value, and sets sequentially the second communication parameter in relation to the data transmitting condition used in the server device to the determined second optimal communication parameter. According thereto, it is also possible for the server device to determine promptly and set the second optimal communication parameter conformable to the communication condition and communication state, thereby to set appropriately the data transmitting condition from the server device, as a result, improving the communication efficiency better.

BRIEF DESCRIPTION OF THE DRAWINGS

FIG. 1 is an outlined view of a navigation system according to a first embodiment of the present invention.

FIG. 2 is a flow chart illustrating functions of the navigation system.

DETAILED DESCRIPTION OF THE PREFERRED EMBODIMENTS

Hereinafter, an embodiment of a navigation system having a navigation device of the present invention will be described with reference to the drawings. As illustrated in FIG. 1, the navigation system 1 is composed of a navigation device 3 mounted in a vehicle 2, a cell phone 4 which can communicate with the navigation device 3, and a map server device 6 which is connected to an internet NW and can be accessed by the cell phone 4 via a cell phone carrier 5.

Inside the vehicle 2, there are the navigation device 3 and the cell phone 4 which is carried by a user. The cell phone 4 has a Bluetooth function and is preliminarily registered in the navigation device 3. When a power source of navigation device 3 mounted in the vehicle is turned on, the cell phone 4 and the navigation device 3 are linked by Bluetooth to perform communication. Further, the cell phone 4 is accessible to the internet NW via wireless communication to the cell phone carrier 5 which is provided by a communication service providing company and is ambient to the vehicle 2. In addition, the cell phone 4 may communicate with the map server device 6 connected to the internet NW via the cell phone carrier 5.

In the navigation system 1, when a user in the vehicle 2 or a driver sets a destination in the navigation device 3, the navigation device 3 performs connection to the map server device 6 via a data communication with the cell phone 4 and transmits to the map server device 6 the present location and the destination. The map server device 6 calculates a traveling route on the basis of the received present location and the destination and transmits the traveling route and peripheral map data to the navigation device 3 via the data communication with the cell phone 4. Thereafter, the navigation device 3, on the basis of the data received from the map server device 6, performs route guidance which guides the user to the destination by means of map display, sound guide and the like.

The navigation device 3 is composed of a CPU, a ROM, a RAM, a signal input circuit, a signal output circuit and the like as hardware, and a program which provides various functions to the CPU and the like. The navigation device 3 has a map display function, a guide display function, a voice data output function and a switch input function. Note that that each function of the navigation device 3 may be constituted respectively by a separate CPU and the like, or may be constituted by a common CPU and the like.

Further, the navigation device 3 includes, as a function thereof, a communication means 11 which controls a communication state via the cell phone 4 and the cell phone carrier 5 to the map server device 6, a response value obtaining means 12 which obtains a response value indicating the communication state, and a communication parameter setting means 13 which sets a communication parameter used in the communication means 11.

The communication means 11 transmits a message, namely "Keep Alive Message", to the map server device 6 for response confirmation, and receives a response message to the "Keep Alive Message" from the map server device 6. The response value obtaining means 12 determines a time duration, that is, a response time, from a time at which the message is transmitted to a time at which the response message is received, and obtains the response value (in the present embodiment, the response time is used as the response value) indicating the communication state in relation to the communication time on the basis of the determined time duration. The communication parameter setting means 13 determines the optimal communication parameter on the basis of the response value obtained by the response value obtaining means 12, and sets the optimal communication parameter in the communication parameter in relation to a communication disconnection condition used in the navigation device 3. Note that in the present embodiment, a time-out value for determining the communication disconnection and a retry number of times after the communication disconnection are set as the communication parameter.

The map server device 6 is composed of a CPU, a ROM, a RAM, a signal input circuit, a signal output circuit, a memorizing unit (for example, a hard disk drive or the like) and the like as hardware, and a program which provides various functions to the CPU and the like. In addition, it is acceptable for the map server device 6 to include a drive unit for retrieving data or the like from a recording medium such as a flexible disk, a CD (Compact Disc), a DVD (Digital Versatile Disc), and recording data or the like on the recording medium. The map server device 6 has a route calculating function for calculating a traveling route. Furthermore, the map server device 6 is constructed therein a data base where map data, a list of destinations or POI (Point of interest), and a list of cities/streets are stored for calculating the traveling route. Note that each function of the map server device 6 may be constituted respectively by a separate CPU and the like, or may be constituted by a common CPU and the like.

Furthermore, the map server device 6 includes, as a function thereof, a second communication means 21 which is connect with the internet NW and controls the communication state with the navigation device 3 via the cell phone 4 and the cell phone carrier 5, and a second communication parameter setting means 22 which sets a second communication parameter used in the second communication means 21.

The second communication means 21 transmits the response message in responses to the receiving of the message for response confirmation from the navigation device 3, and receives the response value transmitted from the navigation device 3. The second communication parameter setting means 22 determines a second optimal communication parameter on the basis of the response value received by the second communication means 21 and sets the second optimal communication parameter in the second communication parameter in relation to a data transmitting condition used in the map server device 6. Note that in the present embodiment, a buffer length used in data transmitting, for example, is used as the second communication parameter.

With reference to FIG. 2, operation (processing on communication and communication parameter management) of the navigation system 1 and the navigation device 3 will be described. The processing is initialized when a route guidance is instructed according to the switch inputting operation from a user. Note that the communication parameter and the second communication parameter are set respectively with predefined values.

Firstly, the communication means 11 of the navigation device 3 performs communication connection to the map server device 6 via the cell phone 4 (S11 to S12).

Thereafter, the navigation device 3 performs an authentication request to the map server device 6 (S21 to S24). Specifically, the communication means 11 of the navigation device 3 transmits an authentication request signal to the cell phone 4 (S21); after receiving the authentication request signal, the cell phone 4 transmits the authentication request signal to the map server device 6 and the second communication means 21 of the map server device 6 receives the authentication request signal (S22). Subsequently, the map server device 6 performs an authentication processing on the navigation device 3. In the case where the navigation device 3 is preliminarily registered, the second communication means 21 transmits to the cell phone 4 a response signal of positive authentication (S23). After receiving the response signal of positive authentication, the cell phone 4 transmits to the navigation device 3 the response signal which is received by the communication means 11 of the navigation device 3 (S24).

Thereafter, the communication means 11 of the navigation device 3 transmits to the map server device 6 via the cell phone 4 a request signal concerning a list information of destination candidates and receives from the map server device 6 via the cell phone 4 the list information (S31 to S34). On the basis of the received list information, the navigation device 3 suggests a destination candidate to the user. Accordingly, the destination is set by the user via switch inputting. Note that the process of S31 to S34 may be omitted if the list information on destination candidates provided by the processing of the navigation device 3 is not necessary in the case where the destination is directly set by the user according to the instructed route guidance.

Subsequently, the navigation device 3 transmits the present location and destination, and "Keep Alive Message" (the message for response confirmation) to the map server device 6 and receives the response message from the map server device 6 via the cell phone 4 (S41 to S44). Note that "Keep Alive Message" is used to determine the response time and to confirm the connection condition, thereby, it will be transmitted periodically. In detail, the communication means 11 of the navigation device 3 transmits the present location, the destination and the "Keep Alive Message" to the cell phone 4 (S41); the data is transmitted to the map server device 6 from the cell phone 4 after the data is received, and the second communication means 21 of the map server device 6 receives the present location, the destination and the "Keep Alive Message" (S42).

Next, the second communication means 21 of the map server device 6 transmits a response message for the "Keep Alive Message" to the cell phone 4 (S43). Also, the map server device 6 performs a calculation processing on the traveling route on the basis of the received present location and the destination. On the basis of the calculated traveling route, the second communication means 21 transmits to the cell phone 4 a traveling route and peripheral map data thereof or a part of the traveling route and the peripheral map data thereof obtained till a timing at which the response message is transmitted. After receiving, the cell phone 4 transmits the mentioned data to the navigation device 3, and the communication means 11 of the navigation device 3 receives the response message, the traveling route and the peripheral map data thereof (S44).

At this time, the navigation device 3 is actually at a receiving standby state and repeats the receiving process on the basis of the communication parameter (the time-out value and the retry number of times). In the case where data is not received from the map server device 6 within the predefined time-out value and the retry number of times, the communication means 11 determines that the communication connection to the map server device 6 is disconnected. In the case where the communication connection is determined to have been disconnected, the processing on the communication and communication parameter management performed in the navigation system 1 is terminated.

Subsequently, the response value obtaining means 12 of the navigation device 3 determines the response time T from a time when the "Keep Alive Message" is transmitted in S41 to a time when the response message is received in S44. On the basis of the determined response time T (response value), the communication parameter setting means 13 determines the optimal communication parameter and sets it thereafter (S50). In detail, the memory (RAM, ROM) of the navigation device 3 is pre-stored with a table showing a correlation between the response time and the communication parameter, the communication parameter setting means 13 determines a communication parameter corresponding to the determined response time T as the optimal communication parameter and sets it thereafter, by using the aforementioned table.

The communication means 11 of the navigation device 3 transmits the "Keep Alive Message" and the response value obtained in S50 to the map server device 6 via the cell phone 4, and receives a response from the map server device 6 (S61 to S64). In detail, the communication means 11 of the navigation device 3 transmits the "Keep Alive Message" and the response value to the cell phone 4 (S61), the data is transmitted to the map server device 6 from the cell phone 4 after being received, and the second communication means 21 of the map server device 6 receives the "Keep Alive Message" and the response value (S62).

Thereafter, the second communication means 21 of the map server device 6 transmits a response message for the "Keep Alive Message" transmitted in S61 and the traveling route calculated in S43 and the peripheral map data thereof or a part of the traveling route and the peripheral map data thereof to the cell phone 4 (S63). In this instance, the second communication means 21 transmits the data to the cell phone 4, using the defined second communication parameter (buffer length) in relation to the data transmitting condition. Thereafter, the data is transmitted to the navigation device 3 from the cell phone 4 after receiving, and the communication means 11 of the navigation device 3 receives the response message, the traveling route and the peripheral map data thereof (S64). In this case, in the data-receiving in S64, the communication parameter set in S50 is used to perform the data-receiving process. According thereto, the data-receiving process is performed according to the communication condition and the communication state, thereby improving the communication efficiency.

Meanwhile, the second communication parameter setting means 22 of the map server device 6 determines the second optimal communication parameter on the basis of the response time T (response value) received in S62. In detail, the memory of the map server device 6 is pre-stored with a table showing a correlation between the response time and the second communication parameter, the second communication parameter setting means 22 sets a second communication parameter corresponding to the determined response time T as the second optimal communication parameter, by using the aforementioned table.

Subsequently, similar to that in S50, the response value obtaining means 12 of the navigation device 3 determines the response time T from a time when the "Keep Alive Message" is transmitted in S61 to a time when the response message is received in S64. On the basis of the determined response time T (response value), the communication parameter setting means 13 determines the optimal communication parameter and sets it thereafter (S80).

Thereafter, the process from S61 to S80 is repeated until the entire data on the traveling route and the peripheral map data are received by the navigation device 3. When the receiving of the entire data is finished, the processing on the communication and the communication parameter management in the navigation system 1 is terminated. During the processing, the response value obtained in S80 of a previous processing is sequentially sent out in S61, and on the basis of the response value, the second communication parameter is set sequentially in S70. Since the communication parameter sequentially set in S80 of the previous processing is used in S64, the disconnection of the communication connection conformable to the communication condition and the communication state is judged appropriately in the navigation device 3, thereby improving the communication efficiency. Further, the second optimal communication parameter sequentially set in S70 of the previous processing is used in S63, the data conformable to the communication condition and the communication state is transmitted in the map server device 6, thereby improving the communication efficiency.

In the case where the user re-routes (re-searches a traveling route), or requests a different destination, the process returns to S31, the processing from S31 to S70 is repeated.

The above describes the processing on the communication and the communication parameter management.

According to the navigation system 1 and the navigation device 3 of the present embodiment, the response value representing the communication state is obtained on the basis of the determined time duration from a time when the message is transmitted to a time when the response message is received; the optimal communication parameter is determined on the basis of the response value; and the communication parameter used in the navigation device 3 is sequentially adjusted to the determined optimal communication parameter. In the map server device 6, the second optimal communication parameter is determined on the basis of the response value, and the second communication parameter used in the map server device 6 is sequentially adjusted to the determined second optimal communication parameter. Accordingly, the optimal communication parameter and the second optimal communication parameter conformable to the communication condition and the communication state can be determined and set instantly, thereby improving the communication efficiency.

In the present embodiment, the communication parameter configuring means 13 and the second communication parameter configuring means 22 set the optimal communication parameter and the second communication parameter by using the pre-stored table; as another embodiment, for example, it is acceptable to set the optimal communication parameter by modifying the communication parameter set at the moment according to the determined response time. Specifically, for example, the longer the response time is, the longer the time-out value will be modified and the retry number of times will be reduced. On the other hand, the shorter the response time is, the shorter the time-out value will be modified and the retry number of times will be increased.

In the present embodiment, the map server device 6 includes the second communication parameter setting means 22, the response value transmitted from the communication means 11 is received by the second communication means 21, and the second communication parameter is sequentially set optimally in the map server device 6 side. However, as another embodiment, it is acceptable that the second communication parameter setting means 22 is not included and the communication parameter is sequentially set optimally in the navigation device 3 side. In this case, it is also possible to determine promptly the optimal communication parameter conformable to the communication conditions such as the types and the functions of the communication means, the communication state such as the areas, the time slots and the like, thereby improving the communication efficiency.

In the present embodiment, the time-out value for determining the communication disconnection and the retry number of times after the communication disconnection are set as the communication parameter set by the communication parameter setting means 13. However, it is acceptable to set the other conditions relating to the communication disconnection as the communication parameter.

In the present embodiment, the response time is obtained as the response value; it is also acceptable to obtain the other value representing the communication state in relation to the communication time as the response value. For example, in the case where the processing on receiving the response message is repeated within the set time-out value and the retry number of times, it is acceptable to use, as the response value, a retry number of times or the like in the processing on receiving the response message until the response message is actually received. Moreover, it is acceptable to use a combination of the mentioned values as the response value.

In the present embodiment, the navigation device uses the cell phone carried by the user as a communication unit to communicate with the map server device via the cell phone. It is acceptable to use, for example, a communication unit mounted or installed inside the navigation device to communicate with the map server device.

In the present embodiment, the navigation device is set as being mounted in a vehicle. Other than a vehicle, it is acceptable to mount the navigation device in a functional device which has mobility such as a robot, or a mobile information terminal, for example, a cell phone or the like, which is carried by a user. It is also acceptable for the navigation itself to be carried by a user as a mobile information terminal.

Although the present invention has been explained in relation to the preferred embodiments and drawings but not limited, it should be noted/it is to be understood that other possible modifications and variations made without departing from the gist and scope of the invention will be comprised in the present invention. Therefore, the appended claims encompass all such changes and modifications as falling within the gist and scope of the present invention.

What is claimed is:

1. A navigation system having a mobile or mounted navigation device, and a server device which provides information to the navigation device via communication, wherein the navigation device includes a communication section which transmits a message to the server device for a response confirmation and a present location of the functional device and destination, and receives a response message with respect to the message from the server device;

a response value obtaining section which determines a time duration from a time when the message is transmitted to another time when the response message is received, and obtains a response value indicating a communication state in relation to a communication time on the basis of the determined time duration; and a communication-parameter setting section which determines an optimal communication parameter on the basis of the response value obtained by the response value obtaining device, and sets the optimal communication parameter in a communication parameter in relation to a communication disconnection condition used in the navigation device, wherein the communication section of the navigation device transmits the response value obtained by the response value obtaining section to the server device, wherein the server device includes:

a second communication section which transmits the response message in response to the receiving of the message transmitted from the navigation device, and which receives the response value transmitted by the navigation device; and a second communication parameter setting section which determines a second optimal communication parameter on the basis of the response value received by the second communication section, and sets the second optimal communication parameter in a second communication parameter in relation to a data transmitting condition used in the server device, wherein the determination of the optimal communication parameter and the second optimal communication parameter are sequentially determined until all of a traveling route data based on the present location and destination and all of a peripheral map data of the traveling route by the navigation device are received, and wherein the second communication parameter is a buffer length used in data transmitting.

2. The navigation system according to claim 1, wherein the communication parameter includes at least one of a time-out value for determining the communication disconnection and a retry number of times after the communication disconnection.

* * * * *